US009778125B2

(12) United States Patent
Pechstedt et al.

(10) Patent No.: US 9,778,125 B2
(45) Date of Patent: Oct. 3, 2017

(54) OPTICAL PRESSURE SENSOR

(71) Applicant: Oxsensis Limited, Chilton, Didcot (GB)

(72) Inventors: Ralf-Dieter Pechstedt, Didcot (GB); Fabrice F. M. Maillaud, Ormes (FR)

(73) Assignee: Oxsensis Limited, Didcot (GB)

( * ) Notice: Subject to any disclaimer, the term of this patent is extended or adjusted under 35 U.S.C. 154(b) by 0 days.

(21) Appl. No.: 15/405,161

(22) Filed: Jan. 12, 2017

(65) Prior Publication Data

US 2017/0122828 A1 May 4, 2017

Related U.S. Application Data

(63) Continuation of application No. 14/385,358, filed as application No. PCT/GB2013/050620 on Mar. 13, 2013, now Pat. No. 9,581,514.

(30) Foreign Application Priority Data

Mar. 16, 2012 (GB) .................................. 1204674.4

(51) Int. Cl.
| G01L 19/04 | (2006.01) |
| G01L 11/02 | (2006.01) |
| G01L 9/00 | (2006.01) |
| G01J 3/02 | (2006.01) |
| G01D 3/028 | (2006.01) |
| G01J 3/26 | (2006.01) |
| G01J 9/02 | (2006.01) |

(52) U.S. Cl.
CPC .............. *G01L 11/02* (2013.01); *G01D 3/028* (2013.01); *G01J 3/0286* (2013.01); *G01J 3/26* (2013.01); *G01L 9/0079* (2013.01); *G01L 19/04* (2013.01); *G01J 2009/0257* (2013.01)

(58) Field of Classification Search
CPC ........ G01L 11/02; G01D 3/028; G01J 9/0246; G01J 2009/0257; G01J 3/26; G01J 3/0286
USPC .......... 73/705, 708, 714; 356/454, 505, 506, 356/519
See application file for complete search history.

(56) References Cited

U.S. PATENT DOCUMENTS

| 4,523,092 A | 6/1985 | Nelson |
| 4,620,093 A | 10/1986 | Barkhoudarian et al. |
| 5,275,053 A | 1/1994 | Wlodarczyk et al. |
| 5,612,778 A | 3/1997 | Hall et al. |
| 5,657,405 A | 8/1997 | Fujiwara |

(Continued)

FOREIGN PATENT DOCUMENTS

| EP | 0 290 646 A1 | 11/1988 |
| EP | 0 528 657 A2 | 2/1993 |

(Continued)

OTHER PUBLICATIONS

International Search Report and Written Opinion dated Jun. 20, 2013 in connection with International Application No. PCT/GB2013/050620.

(Continued)

*Primary Examiner* — Benjamin Schmitt
(74) *Attorney, Agent, or Firm* — Wolf, Greenfield & Sacks, P.C.

(57) ABSTRACT

An optical pressure sensor is disclosed having a pressure sensing optical cavity. A temperature sensing optical cavity at the sensing head is used by an interrogator to correct a pressure signal for effects of temperature. The optical cavities may be, for example, Fabry Perot cavities in the sensor head.

27 Claims, 9 Drawing Sheets

(56) References Cited

U.S. PATENT DOCUMENTS

| | | |
|---|---|---|
| 6,056,436 A | 5/2000 | Sirkis et al. |
| 6,622,549 B1 | 9/2003 | Wlodarczyk et al. |
| 9,581,514 B2 | 2/2017 | Pechstedt et al. |
| 2007/0006663 A1 | 1/2007 | Zerwekh et al. |
| 2007/0013914 A1 | 1/2007 | May et al. |
| 2009/0199646 A1 | 8/2009 | Sakamoto et al. |
| 2015/0020599 A1 | 1/2015 | Pechstedt et al. |

FOREIGN PATENT DOCUMENTS

| | | |
|---|---|---|
| EP | 1 586 867 A2 | 10/2005 |
| EP | 2 072 986 A1 | 6/2009 |
| EP | 2 259 039 A1 | 12/2010 |
| GB | 2 202 936 A | 10/1988 |
| GB | 2 493 771 A | 2/2013 |
| JP | 2002-372472 A | 12/2002 |
| JP | 2003-166891 A | 6/2003 |
| WO | WO 2005/024365 A2 | 3/2005 |
| WO | WO 2005/098385 A1 | 10/2005 |
| WO | WO 2007/109336 A2 | 9/2007 |
| WO | WO 2009/077727 A2 | 6/2009 |
| WO | WO 2010/043876 A2 | 4/2010 |

OTHER PUBLICATIONS

International Preliminary Report on Patentability dated Sep. 25, 2014 in connection with International Application No. PCT/GB2013/050620.

United Kingdom Search Report dated Jul. 19, 2012 in connection with United Kingdom Application No. GB1204674.4.

Bremer et al., Conception and preliminary evaluation of an optical fibre sensor for simultaneous measurement of pressure and temperature. Proc SPIE. 2009; 7503: 750301-4.

Jiang, Fourier Transform White-Light Interferometry for the Measrurement of Fiber-Optic Extrinsic Fabry-Perót Interferometric Sensors. IEEE Photonics Technology Letters. Jan. 15, 2008; 20(2):75-7.

OPTICAL PRESSURE SENSOR

CROSS-REFERENCE TO RELATED APPLICATIONS

This application is a continuation of and claims priority under §120 to U.S. patent application Ser. No. 14/385,358 filed Sep. 15, 2014, titled "OPTICAL PRESSURE SENSOR," which is a U.S. National Stage Application under 37 U.S.C. §371 of International Application No. PCT/GB2013/050620, filed Mar. 13, 2013, titled "OPTICAL PRESSURE SENSOR," which claims priority to United Kingdom Application No. 1204674.4 filed Mar. 16, 2012, entitled "OPTICAL PRESSURE SENSOR," each of which is hereby incorporated by reference in its entirety.

The present invention relates to an optical pressure sensor, for example an optical pressure sensor in which pressure is measured using a pressure sensing optical cavity at a sensor head, which is interrogated optically.

INTRODUCTION

Optical pressure sensors implemented using one or more optical cavities, such as Fabry Perot cavities are known, for example from GB 2202936, in which the interrogation of a two mirror Fabry-Perot pressure sensor head is realized using light of two different wavelengths delivered along an optical fibre. The ratios of the detected intensities of the two wavelengths in the back reflected light, suitably normalized using a reference feed directly from the light source, is used as a measure of optical path difference in the sensor head, which is in turn responsive to the applied pressure.

Other optical pressure sensors based on Fabry-Perot cavities in a sensor head are described in WO2005/098385 and WO2009/077727. These documents describe sensor heads for use at high temperatures where materials such as silica glass and silicon may not be appropriate, and instead propose sensor heads fabricated using sapphire, and in some cases optically interrogated through sapphire optical fibre terminating proximally to or in contact with the sensor head. In these types of Fabry-Perot sensor heads pressure is measured by pressure-induced deflection of at least one reflective surface of a physical cavity in the sensor head.

The dimensions and optical characteristics of a pressure sensor head for use at elevated temperatures will typically be sensitive to the temperature of operation, for example due to changes in material properties and due to thermal expansion. These effects can lead to errors in the pressure measurement. Furthermore, although the optical response at a pressure sensor head may be reasonably linear over smaller changes in pressure, over larger ranges the response is unlikely to be linear making calibration of the sensor more difficult, and moreover, the response curves over larger ranges of pressure for different temperatures will not be parallel.

These calibration issues present particular difficulties when an optical pressure sensor is to be used to measure absolute pressure, as well as or instead of a dynamic pressure change such as an acoustic signal.

It is possible to design a sensor head using an optical cavity where the optical response to pressure is more linear, but this tends to lead to a reduction in sensitivity and range of measurement. A sensor designed for linearity in this way is unlikely to combine the fine sensitivity required for response to small dynamic pressure variations, for example in measuring acoustic pressure signals, with the broad range required to measure more slowly varying or static pressure which may range over several times $10^5$ Pa.

It would be desirable to address these and other problems in the related prior art.

SUMMARY OF THE INVENTION

The invention provides improvements to existing optical pressure sensors to enable absolute rather than just dynamic pressure change measurements by introducing improved temperature compensation. In particular, the temperature compensation may be based on an optically measured temperature near to or at an optical cavity measuring pressure, rather than spaced apart or at a distance from the pressure cavity, thereby providing more accurate temperature compensation.

Accordingly, the invention provides an optical pressure sensor comprising: a sensor head comprising a pressure sensing optical cavity and at least one temperature sensing optical cavity; and an interrogator optically coupled to the sensor head, and arranged to generate at least one signal representing pressure at the sensor head responsive to the pressure sensing optical cavity, the signal representing pressure being temperature corrected by the interrogator responsive to the temperature sensing optical cavity.

The optical cavities may be integrally formed in the sensor head. The pressure sensing optical cavity may comprise or correspond to a physical cavity in the sensor head, for example being filled with a low pressure gas. Each of the at least one temperature sensing optical cavities may be formed from or comprise solid material of the sensor head. Such material then may define one or more temperature sensing optical cavities bounded by spaced reflective surfaces within the sensor head.

The pressure sensing optical cavity and at least one of the at least one temperature sensing optical cavities may be adjacent to each other. This can be used to provide a more accurate determination of temperature at the pressure sensing optical cavity. For example, one of the spaced reflective surfaces of a temperature sensing cavity may also define a surface of the physical cavity in the sensor head which provides the pressure sensing optical cavity.

The pressure sensing optical cavity and the at least one temperature sensing optical cavity may be Fabry-Perot optical cavities, for example Fabry-Perot cavities which are parallel to each other and which are interrogated using the same optical fibre coupling the sensor head to the interrogator.

The sensor head may comprise at least two temperature sensing optical cavities, the interrogator being arranged to temperature correct the signal representing pressure responsive to both of the temperature sensing optical cavities.

For operation at high temperatures, for example in excess of 1000° C., the sensor head may be formed of sapphire.

The interrogator may comprise both a first optical analyser arranged to detect response of the pressure sensing optical cavity to pressure at the sensor head, and a second optical analyser arranged to detect response of the at least one temperature sensing optical cavity to temperature at the sensor head. The first and second optical analysers may be separate, or may share some common optical components, but typically will at least use separate probe light detection elements. For example, the first optical analyser may be arranged to separately detect the intensities of two different wavelengths of probe light reflected at the pressure sensing optical cavity, and to generate the signal representing pressure at the sensor head responsive to a relationship between the detected intensities of the two different wavelengths. Such a relationship may be, for example a ratio or some other functional relationship. The second optical analyser may comprise, for example, a spectral engine or spectrometer arranged to detect an interference spectrum in probe light reflected from the temperature sensing optical cavity, and be arranged to detect response of the at least one temperature sensing optical cavity to temperature based on the interference spectrum, for example by locating the position of a peak in a discrete Fourier transform of the interference spectrum and analyzing its phase content.

The first optical analyser may be adapted to detect response of the pressure sensing optical cavity to pressure at the sensor head and output a corresponding signal at a much faster rate than the second optical analyser is arranged to detect response of the at least one temperature sensing optical cavity to temperature and output a corresponding signal. For example, the first optical analyser may operate at a rate in excess of 10 KHz, for example at about 40 KHz, in order to provide acoustic pressure signals, while the second optical analyser may operate at a rate of less than 1 KHz, for example at about 100 Hz, sufficient to match the rate of significant temperature fluctuations in the sensor head. If required, the outputs of the first and second optical analyzers may then be used to generate a low frequency pressure signal, which includes the static or absolute pressure, and a high frequency pressure signal which includes rapid variations in pressure but not the static or absolute pressure.

The detected response of the second optical analyser to the temperature sensing optical cavity may include a component or contribution from pressure at the sensor head, for example because of an inability of the second optical analyser to resolve the pressure sensing optical cavity separately to the temperature sensing cavity, for example because the pressure sensing optical cavity is much smaller than the temperature sensing optical cavity. The interrogator may then be arranged to provide the temperature correction to the signal representing pressure, with a further correction for the partial response of the second optical analyser to pressure at the sensor head, and in particular to the pressure sensing optical cavity.

In particular, the interrogator may be arranged to provide the temperature correction to the signal representing pressure by: calculating a first estimate of pressure using response of the pressure sensing optical cavity to pressure at the sensor head and a first estimate of temperature based on response of the at least one temperature sensing optical cavity to temperature at the sensor head; calculating a second estimate of temperature based on the first estimate of pressure and the first estimate of sensor temperature; and calculating a second estimate of pressure using said response of the pressure sensing optical cavity to pressure at the sensor head and said second estimate of temperature.

One or more further iterations may be carried out by calculating a further revised estimate of temperature based on a revised estimate of pressure and a revised estimate of temperature, and a further revised estimate of pressure using said response of the pressure sensing optical cavity to pressure at the sensor head and said further revised estimate of temperature.

The step of calculating each estimate of pressure may be performed, for example, using a calibration of response of the pressure sensing optical cavity to pressure at the sensor head against calibration temperatures and calibration pressures at the sensor head, and the step of calculating each revised estimate of temperature may be performed using a calibration of response of the at least one temperature sensing optical cavity head against calibration temperatures and pressures at the sensor head.

The invention also provides methods of operating an optical pressure sensor and a method of calibrating an optical pressure sensor corresponding to the above apparatus and discussion, the methods being carried out, for example, using sensor heads and apparatus as set out above and described in more detail below.

In particular, the invention provides a method of operating an optical pressure sensor comprising a sensor head having a pressure sensing optical cavity and at least one temperature sensing optical cavity, comprising: optically detecting said pressure sensing cavity and said at least one temperature sensing cavity; and generating at least one signal representing pressure at the sensor head responsive to the detection of the pressure sensing optical cavity, the step of generating comprising temperature correcting the signal representing pressure responsive to detection of the at least one temperature sensing optical cavity.

The detection of the temperature sensing optical cavity may additionally be responsive to pressure at the sensor head, for example if the pressure sensing optical cavity is not resolved from the temperature sensing optical cavity in optical detection of the temperature sensing optical cavity, or for other reasons. In this case, the step of generating may comprise providing a further correction for influence of pressure at the sensor head on the detection of the at least one temperature sensing optical cavity.

More particularly, the step of generating the signal representing pressure at the sensor head may comprises: calculating a first estimate of pressure using response of the pressure sensing optical cavity to pressure at the sensor head and a first estimate of temperature based on response of the at least one temperature sensing optical cavity to temperature at the sensor head; calculating a second estimate of temperature based on the first estimate of pressure and the first estimate of sensor temperature, to thereby at least partially correct for the influence of pressure on the first estimate of temperature; and calculating a second estimate of pressure using said response of the pressure sensing optical cavity to pressure at the sensor head and said second estimate of temperature.

To provide a more refined estimate of pressure, the method may comprise one or more further iterations of calculating a further revised estimate of temperature based on a revised estimate of pressure and a revised estimate of temperature, and a further revised estimate of pressure using said response of the pressure sensing optical cavity to pressure at the sensor head and said further revised estimate of temperature.

The step of calculating each estimate of pressure may be performed using a calibration of response of the pressure sensing optical cavity to pressure at the sensor head against calibration temperatures and calibration pressures at the sensor head, and the step of calculating each revised estimate of temperature may be performed using a calibration of response of the at least one temperature sensing optical cavity head against calibration temperatures and pressures at the sensor head.

Although the methods of the invention may be used in a variety of sensor head constructions, the pressure sensing optical cavity and the at least one temperature sensing optical cavity may be Fabry Perot cavities at the sensor head. More particularly, the pressure sensing optical cavity and at least one of the at least one temperature sensing optical cavities may be adjacent to each other in the sensor head, and may be parallel to each other. At least one of the one or more temperature sensing optical cavities may be detected using a spectral method which does not resolve the pressure sensing optical cavity from the temperature sensing optical cavity, thereby giving rise at least in part to influence of pressure on the sensor head on detection of the temperature sensing optical cavity.

BRIEF SUMMARY OF THE DRAWINGS

Embodiments of the invention will now be described, by way of example only, with reference to the accompanying drawings, of which.

DETAILED DESCRIPTION OF EMBODIMENTS

Figure 1:
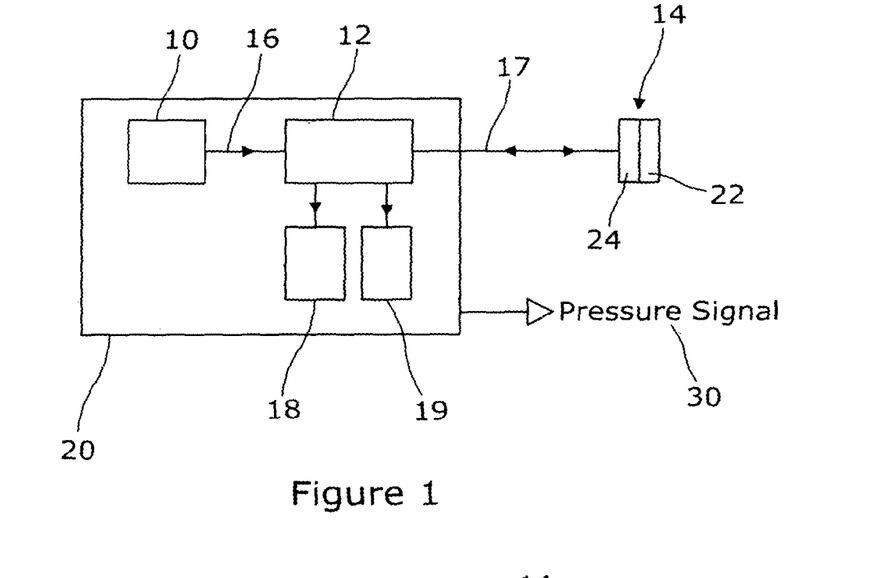
FIG. 1 illustrates a pressure sensor embodying the invention.

Referring to FIG. 1 there is shown schematically an optical pressure sensor embodying the invention. A light source 10 delivers probe light through an optical coupling arrangement 12 to a sensor head 14 through optical fibres 16,17. Probe light reflected back from the sensor head 14 is coupled by the coupling arrangement 12 to one or more optical analysers 18, 19 which form a part of interrogator 20. As shown in the figure, the light source 10 and the coupling arrangement 12 may also form a part of the interrogator 20. The light source 10 may comprise, for example, one or more super luminescent diodes. Broadband probe light could also or instead be provided using one or more scanning wavelength laser sources, in association with other suitable changes to the interrogator 20.

The sensor head 14 is provided with at least a pressure sensing optical cavity 22 and at least one further optical cavity which is a temperature sensing optical cavity 24. The pressure sensing and temperature sensing cavities are distinct, but may overlap. Typically, the optical cavities may be Fabry-Perot cavities, but other interferometer cavities may be used.

The interrogator is arranged to generate one or more pressure signals 30 representing pressure, changes in pressure, or another quantity related to the pressure at the sensor head, responsive to interference effects in the backscattered light arising from the pressure sensing optical cavity as detected, for example by a first one of the optical analysers 18. However, the interrogator is also arranged to correct the signals 30 representing pressure for temperature effects at the sensor head 14, by being responsive to interference effects in the backscattered light arising from the temperature sensing optical cavity, for example as detected by a second one of the optical analysers 19.

Figure 2:
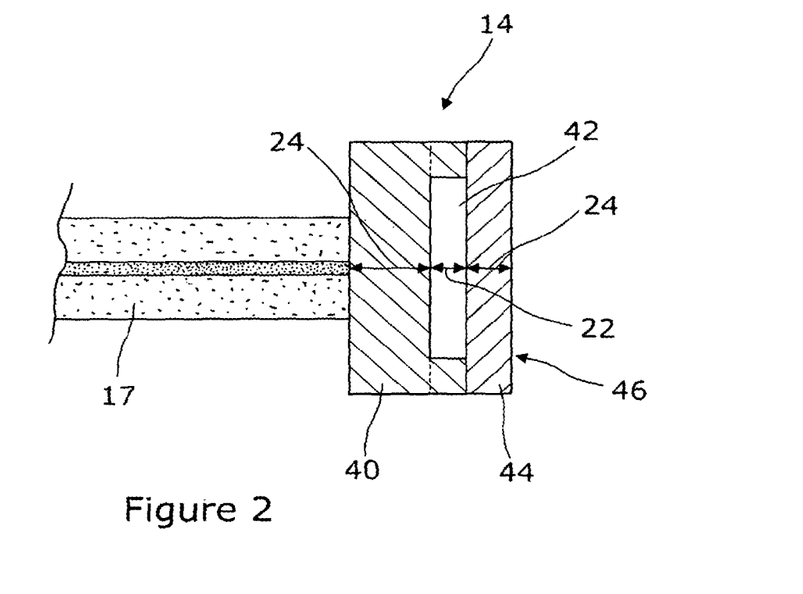
FIG. 2 shows in cross section more detail of a sensor head of the pressure sensor of FIG. 1 comprising a pressure sensing optical cavity and a temperature sensing optical cavity.

A sensor head 14 suitable for use with the optical pressure sensor of FIG. 1 is shown in FIG. 2. Other suitable sensor heads are discussed in WO2005/098385 and WO2009/077727 which are hereby incorporated by reference. For operation at high temperatures, for example in excess of 1000° C., the sensor head may be fabricated from sapphire as also discussed in WO2005/098385 and WO2009/077727. However, the sensor head may be fabricated from other suitable dielectric materials which are sufficiently transparent to the probe light at the required temperatures of operation.

The example sensor head illustrated in FIG. 2 comprises a substrate 40 into which is etched or otherwise formed a recess 42. The recess is capped using a membrane 44, typically of the same material as the substrate 40. The recess 42 may be filled, for example, with a low pressure inert gas. External pressure on the sensor causes deflection of the membrane 44 relative to the substrate 40, thereby changing the depth of the recess 42 slightly. The depth of the recess may typically be a few μm, and the thickness of the substrate may typically be a few hundred μm. The thickness of the membrane 44 may be selected depending on its diameter, the mechanical properties of the material used, and the range of pressures which are to be measured, so as to provide a deflection range under that range of pressures which can be suitably detected by the interrogator 20.

The sensor head 14 may be coupled to the interrogator 20 by being in direct contact with an end of optical fibre 17 or of a length of optical fibre coupled in turn to optical fibre 17, for example being fusion bonded to the optical fibre, or may be spaced from the end of the optical fibre in various ways, for example as discussed in WO2009/077727.

In the example sensor head of FIG. 2, the pressure sensing optical cavity 22 is provided by a Fabry-Perot cavity formed from the opposing major surfaces of the cavity formed by the recess 42 capped by the membrane. The one or more temperature sensing cavities 24 may be provided by optically reflective surfaces of the substrate and/or of the membrane 24 forming one or more Fabry-Perot cavities, as shown in the figure.

More generally, the various optical cavities used by the pressure sensor may be integrally formed in various ways in the sensor head 14. Typically, the pressure sensing optical cavity 22 will be partly or entirely provided by a physical cavity in the solid material of the sensor head so that the length of this cavity changes predominantly under the influence of external pressure. Each of the at least one temperature sensing optical cavities will typically provided partly or entirely by solid material of the sensor head so as to change optical length under influences of temperature due to thermal expansion and temperature effects on refractive index of the solid material without being dominated by changes in pressure. The pressure sensing optical cavity 22 will also change length under the influence of changes in temperature, for example due to thermal expansion of the solid material of the substrate 40 which supports the membrane 44.

The various surfaces of the Fabry-Perot or other cavities in the sensor head may be polished and/or provided with one or more coatings to change or enhance the reflective properties of the surfaces. Surfaces of the Fabry-Perot or other types of optical cavities may be provided by boundaries of the material forming the sensor head, but may also be formed where appropriate by boundaries between different materials within the sensor head, for example at a boundary of two materials having different refractive index.

As exemplified in FIG. 2, the one or more temperature sensing optical cavities 24 may be located adjacent to the pressure sensing cavity 22. Typically, one outside surface 46 of the membrane 44 may be exposed to high temperatures such that the gradient of temperature across the sensor head is significant. Locating the temperature sensing cavities close to the pressure sensing cavity allows detection of temperature to be a more accurate measure of the temperature influencing the optical length of the pressure sensing cavity 22. Use of two or more temperature sensing cavities, for example on either side of the pressure sensing cavity as shown in FIG. 2, also allows a more accurate measure of the temperature influencing the optical length of the pressure sensing cavity 22, for example by averaging the temperatures measured using the two temperature sensing cavities or using a more complex calculation.

Figure 3:
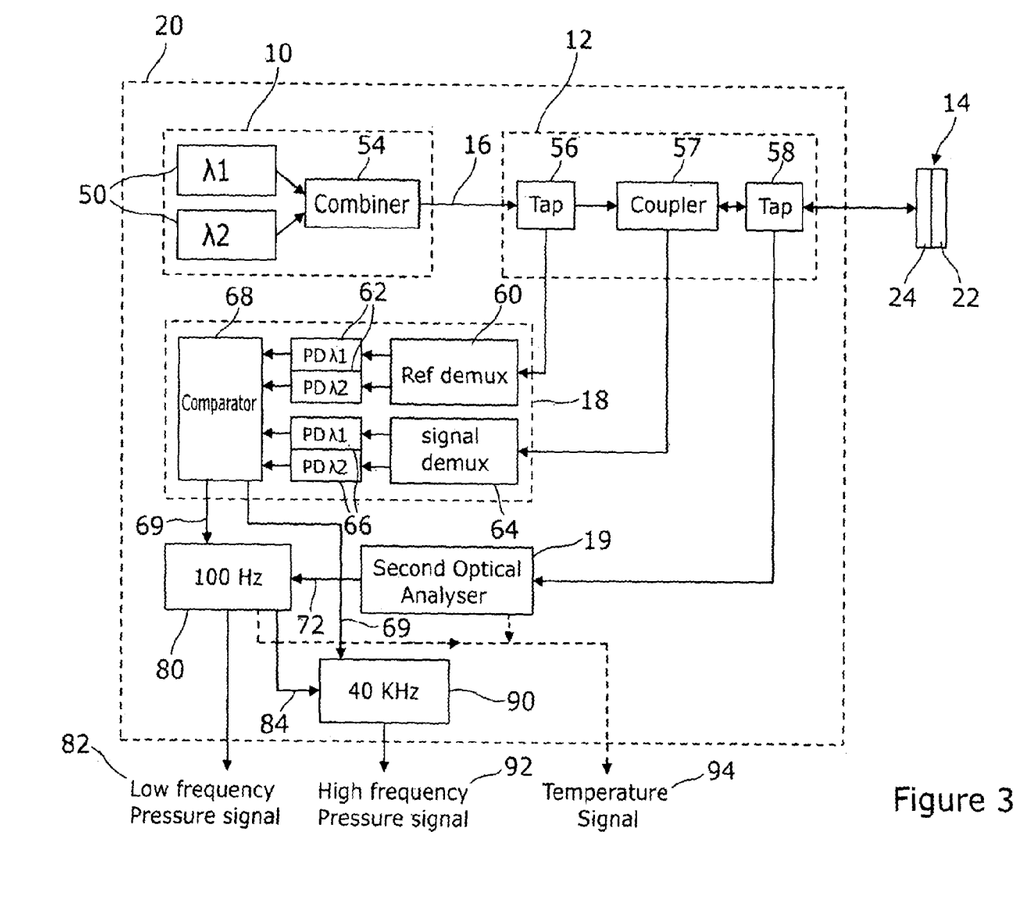
FIG. 3 is a schematic showing in more detail how the interrogator of FIG. 1 may be implemented using a dual wavelength interrogation of the pressure sensing optical cavity and a spectral analysis interrogation of the temperature sensing optical cavity.

A way in which the pressure sensor, and in particular the interrogator 20 of FIG. 1 can be implemented in more detail is shown in FIG. 3. The light source 10 is provided for example by two super-luminescent diodes of different wavelengths, or optionally by a single super-luminescent diode with suitable filters, to provide two outputs of probe light of two different wavelength A1 and A2. The two outputs are combined at combiner 54 and delivered to the coupling arrangement 12.

A first tap 56 of the coupling arrangement 12 taps about 5%-10% of the probe light for routing to a reference demultiplexer 60 which forms part of the first optical analyser 18. The intensities of the two wavelengths of the reference probe light are then separately detected by reference photodetectors 62. The remaining probe light from the first tap 56 proceeds through an optical coupler 57 and a second tap 58 for delivery to the sensor head 14.

About 5%-10% of the probe light reflected back from the sensor head 14 is tapped by the second tap 58 for routing to the second optical analyser 19 which will be described in more detail below with reference to FIG. 4. A temperature sensing cavity output 72 of the second optical analyser is then representative primarily of a temperature of the one or more temperature sensing optical cavities, for example based on or as represented by the optical path length and/or changes in the optical path length of one or more of the at least one temperature sensing optical cavities 24 of the sensor head 14. The update frequency or data rate of this temperature sensing cavity output 72 may typically be about 100 Hz, because thermal inertia in the sensor head limits the rate at which the actual temperature can change, and the second optical analyser may be of a type of which is easier to construct with better accuracy to operate at relatively low frequencies.

The remaining back reflected light is routed by coupler 57 to a signal demultiplexer 64 of the first optical analyser 18. The two wavelengths of the back reflected probe light are then separately detected by signal photodetectors 66. The signals from the reference photodetectors 62 and from the signal photodetectors 66 are then fed to a comparator 68 for analysis to generate a pressure sensing cavity output signal 69 representative of the optical length and/or changes in the optical length of the pressure sensing optical cavity 22 of the sensor head 14. This can be achieved, for example, by following the techniques taught in the prior art such as in GB2202936. In particular, the comparator may operate by dividing the signal from the back reflected probe light at the first wavelength by the back reflected probe light signal at the second wavelength. The main purpose of this division is to compensate intensity losses which may be present within the optical system that otherwise could be interpreted as a pressure signal. A typical example could be losses introduced due to excessive bending of the lead fibre. The system could be further refined by first dividing the signal from the back reflected probe light by the signal from the reference channel at each wavelength. This additional step may help to reduce the intensity noise originating from the light source.

The frequency of operation and output of the first optical analyser may typically be much higher than that of the second optical analyser. Pressure fluctuations will occur at the sensor head at acoustic frequencies, and to measure these the pressure sensing cavity output may have a frequency or data rate of, for example, around 40 KHz.

The second optical analyser may be implemented using a spectral engine or spectrometer to determine an interference spectrum arising from interaction of the probe light with a temperature sensing cavity. Properties of the interference spectrum can then be used to generate the temperature sensing cavity output 72. One way of carrying out this analysis of the interference spectrum is discussed in Y. Jiang, IEEE Photonics Technology Letters, volume 20, No. 2, January 2008, p 75. In accordance with this document, a discrete Fourier transform of the interference spectrum is calculated, and the positions of one or more peaks in this Fourier transform then correspond to the optical path lengths of one or more optical cavities in the sensor head 14.

Figure 4:
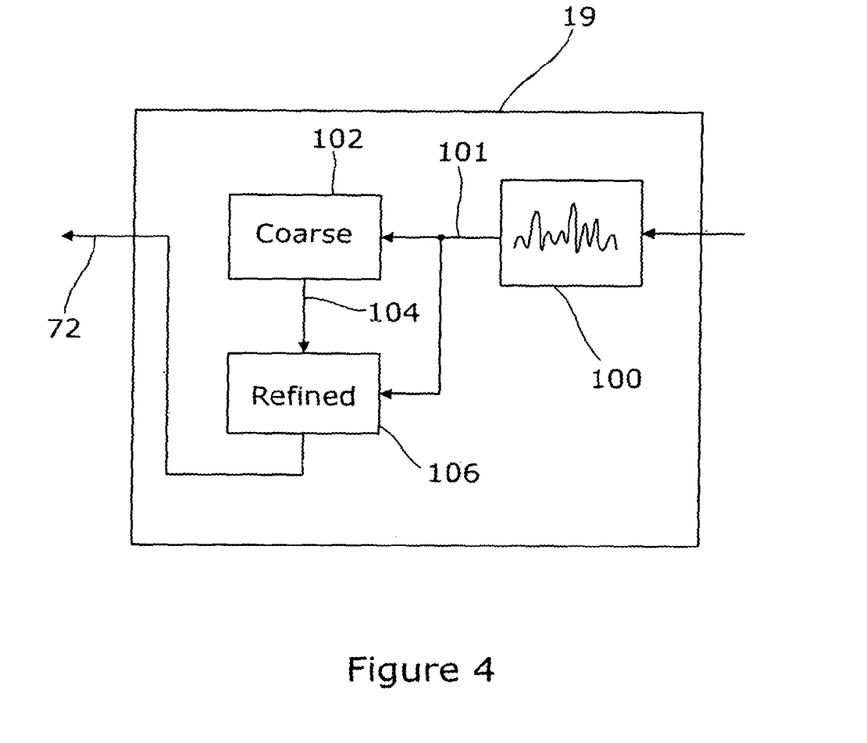
FIG. 4 is a schematic showing an implementation of the second optical analyser of FIG. 3.

FIG. 4 illustrates a technique using which a more accurate determination of the optical path length corresponding to a temperature sensing optical cavity 24 can be made. This technique is described in more detail in a copending patent application entitled "Optical Sensor" filed by the same assignee/applicant and on the same date, before the UK Intellectual Property Office, as the present application. The content of the copending patent application is hereby incorporated by reference in its entirety for all purposes. In FIG. 4, second optical analyser 19 is illustrated as comprising a spectral engine 100 which outputs an interference spectrum 101 arising from interaction of the probe light with interference elements at the sensor head 14 include the temperature sensing cavity. A coarse detector function 102 carries out a coarse analysis of the interference spectrum to derive a coarse temperature sensing cavity output 104. Based on the coarse temperature sensing cavity output 104 and the interference spectrum 101, a refined detector function 106 derives a refined temperature sensing cavity output which provides temperature sensing cavity output 72 of FIG. 3.

In particular, the coarse detector function 102 may use a spectral transform such as a discrete Fourier transform to generate an optical path difference distribution from the interference spectrum 101, positions of peaks of which represent the optical path lengths or differences of optical cavities of the sensor head 14, as discussed in Jiang cited above. Alternatively, an envelope function (for example using a Hilbert transform) may be applied to a cross-correlation of the interference spectrum 101 with a set of transfer functions corresponding to a suitable range of optical path differences, to reveal equivalent peaks. The positions of selected ones of these peaks provide the information required to generate the coarse optical path difference signal or signals. The refined detector function may then track a fine scale peak in a cross-correlation of the interference spectrum 101 with one or more transfer functions chosen, the position of this peak providing the final temperature sensing cavity output 72.

The spectral engine could be implemented, for example, using a dispersive optical element such as a diffraction grating together with a CCD array. The use of a spectral engine or interferometer to generate the temperature sensing cavity output 72 can provide an unambiguous reading of temperature over a large dynamic range. The use of coarse and refined detector functions as outlined above adds the advantage of much finer resolution temperature measurement than is achieved using only the discrete Fourier transform or cross correlation envelope step embodied in the coarse detector function 102 of FIG. 4.

In some embodiments the temperature sensing cavity output may be based on an interferometric response to temperature of a temperature sensing Fabry-Perot or other optical cavity which is on the far side of the pressure sensing optical cavity from the optical coupling with the interrogator, for example the optical cavity formed by the membrane 44 in the arrangement of FIG. 2. However, this cavity may be affected by damage to or contamination of the outer surface 46 of the membrane, for example due to oxidation or soot build up in a gas turbine or other combustion related environment, leading to poor signal or unwanted changes to the optical path length of this cavity. In other embodiments, therefore, a temperature sensing Fabry-Perot or other optical cavity on the same side of the pressure sensing cavity as the optical coupling with the interrogator is used for the temperature sensing output.

In some embodiments a separate temperature cavity output signal 72 may be obtained for each of two or more cavities, for example the two cavities 24 shown in FIG. 2. This could be achieved by using two separate instances of a second optical analyser 19, or a single instance suitable adapted. Alternatively, a combined temperature cavity output signal 72 may be output representing an average or otherwise combined temperature for the two or more cavities.

In the arrangement of FIG. 3 the pressure cavity output signal 69 is passed to both a first processor 80 which is used to calculate static and low frequency components of pressure, and to a second processor 90 which is used to calculate more rapidly varying components of pressure at the sensor head 14, for example omitting the static or low frequency components. As mentioned above, the second optical analyser 19 may typically produce an updated temperature sensing cavity output 72 at a rate of about 100 Hz, and the first processor may generate a low frequency pressure output 82, adjusted to take account of the temperature sensing cavity output 72, at the same about 100 Hz frequency. The first processor 80 also generates a calibration factor 84 which represents the concurrent rate of change of pressure at the sensor head 14 with respect to changes in the pressure sensing cavity output 69, this factor incorporating the effects of temperature on the pressure sensing cavity 22, and this calibration factor 84 is used by the second processor 90 to generate the high frequency pressure signal 92, for example at a rate of about 40 KHz, corresponding to the data rate of the pressure sensing cavity output 69.

Ways in which the low frequency pressure signal 82 may be derived by the first processor 80 taking into account the temperature of the sensor head 14 derived from the one or more temperature sensing cavities, based on suitable calibration procedures, are discussed below.

The interrogator may also be arranged to output one or more temperature signals 94, for example based on or corresponding to the temperature sensing cavity output 72 or T1 as discussed below, typically as output by the second optical analyzer, and/or based on or corresponding to the corrected temperature T2 (or a further iteration T3 etc) as discussed below, typically as output by the first processor 80.

Figure 5:
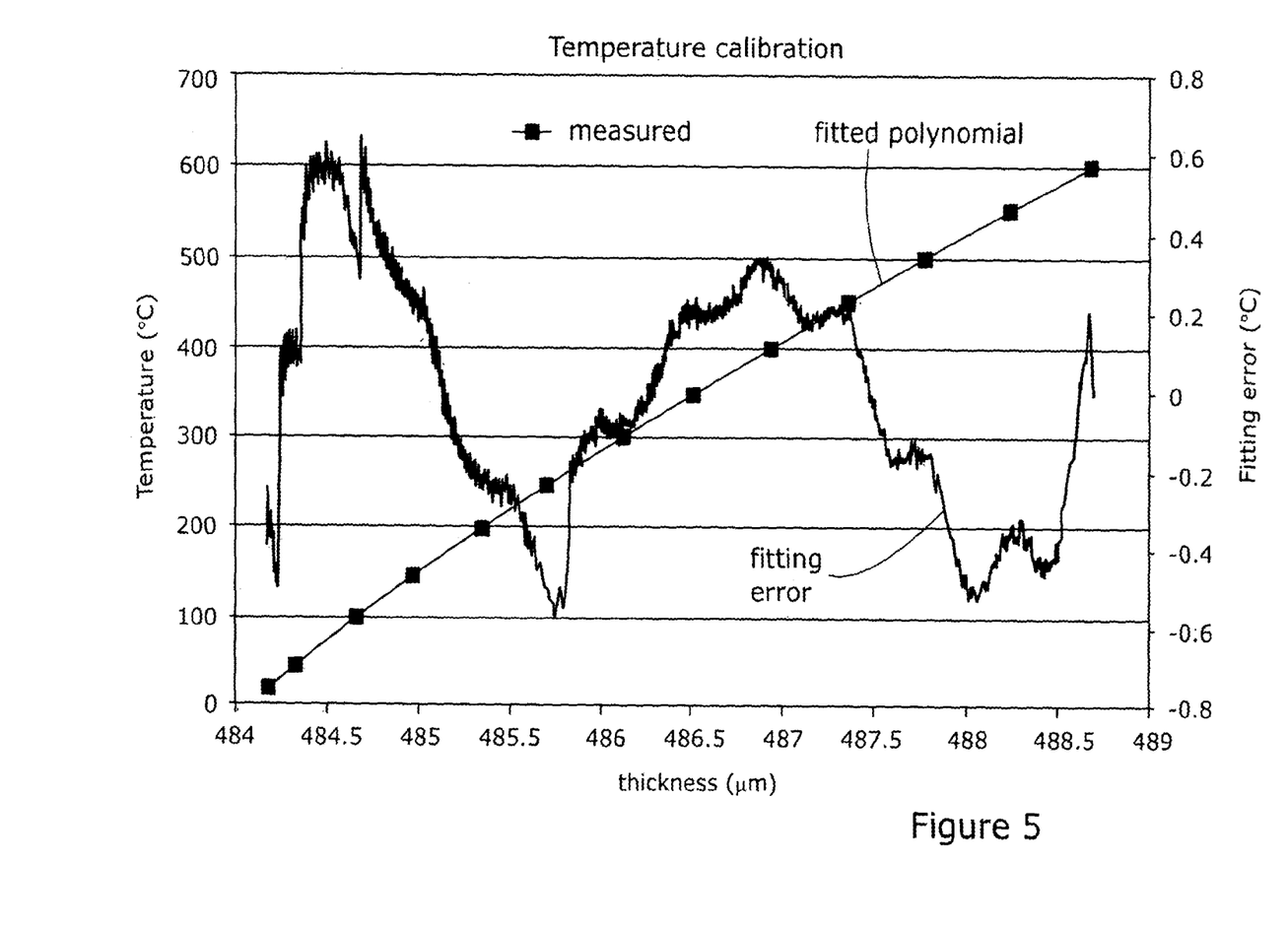
FIG. 5 is a graph showing a calibration curve of a thickness coefficient related to the optical path difference of a temperature sensing cavity against a calibration temperature.

The second optical analyser 19 may be calibrated such that the temperature cavity output signal 72 directly represents the temperature of the temperature sensing cavity 24. This is based on measurements of the temperature sensing cavity response as a function of an imposed calibration temperature $T_c$, at a fixed or approximately fixed pressure such as atmospheric pressure. FIG. 5 shows a typical example of suitable calibration data up to a measured sensor head temperature of 600° C., expressed for clarity here in terms of optical path difference (OPD) of the temperature sensing cavity. For convenience, the OPD axis of the calibration curve of FIG. 5 is expressed in terms of a thickness parameter in units of micrometers according to:

$$\text{thickness}(T_c) = n_g(T_c) d(T_c) / n_g(25° \text{ C.}) \quad (1)$$

The value $n_g(T_c)$ is the group refractive index of the solid material of the temperature sensing cavity at temperature $T_c$, with the equation being normalised using this value at 25° C. $d(T_c)$ is the geometrical thickness of the temperature sensing cavity at temperature $T_c$. Also plotted on the graph of FIG. 5 is the fitting error for a polynomial fit. From this data, the second optical analyser is adapted to output the temperature sensing cavity output 72 as an approximate temperature of the temperature sensing cavity, T1.

Figure 6:
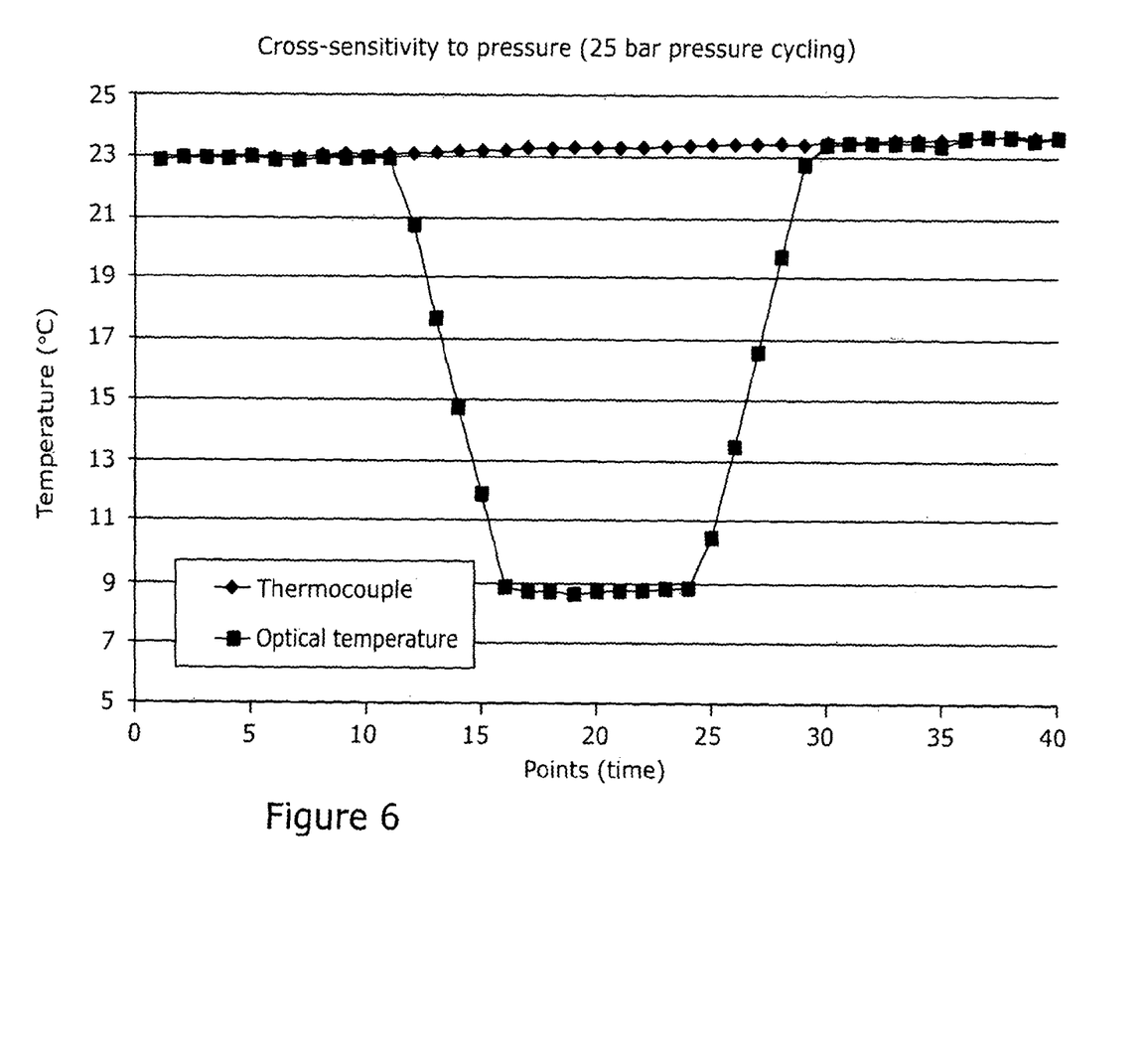
FIG. 6 illustrates an effect of applied pressure to an estimate of sensor head temperature based on optical response of a temperature sensing cavity.

In many designs of the sensor head 14 the optical length of the pressure sensing cavity 22 may be significantly smaller than that of the one or more temperature sensing cavities 24. This may help to avoid residual coherence effects from other optical cavities such as the temperature sensing cavities 24 provided by substrate 40 and membrane 44 in FIG. 2. However, as a result, it may not be possible for the second optical analyser 19, for example when implemented as a spectral engine as described above, to resolve the interference effects of the pressure sensing cavity 22, meaning that the measurement by the second optical analyser of the optical path difference and therefore the approximate temperature T1 of a temperature sensing cavity 24 will be affected by the size of the much smaller pressure sensing cavity 22. In other words, there will be some cross-sensitivity to pressure when measuring temperature using the temperature sensing cavity. FIG. 6 demonstrates this effect using measurements of temperature $T_c$ taken using a thermocouple placed next to the sensor head of FIG. 2, labeled "Thermocouple" on the graph, and temperatures T1 derived by the second optical analyser directly from the temperature cavity output 72 with reference to the calibration curve of FIG. 5, labeled "Optical temperature" on the graph. These temperatures were recorded simultaneously during a pressure cycle from 1 bar ($1 \times 10^5$ Pa) to 25 bar ($2.5 \times 10^6$ Pa), at the time points of the horizontal axis.

In practice, this pressure cross-sensitivity can be measured during the calibration procedure as discussed further below in connection with FIG. 8 below, from which it will be seen that the temperature sensing cavity of a sensor head at a high pressure of 25 bar could for example exhibit a maximum apparent temperature deviation, as an error in T1 due to pressure, of about 15° C. or 2.5% FS.

Figure 7:
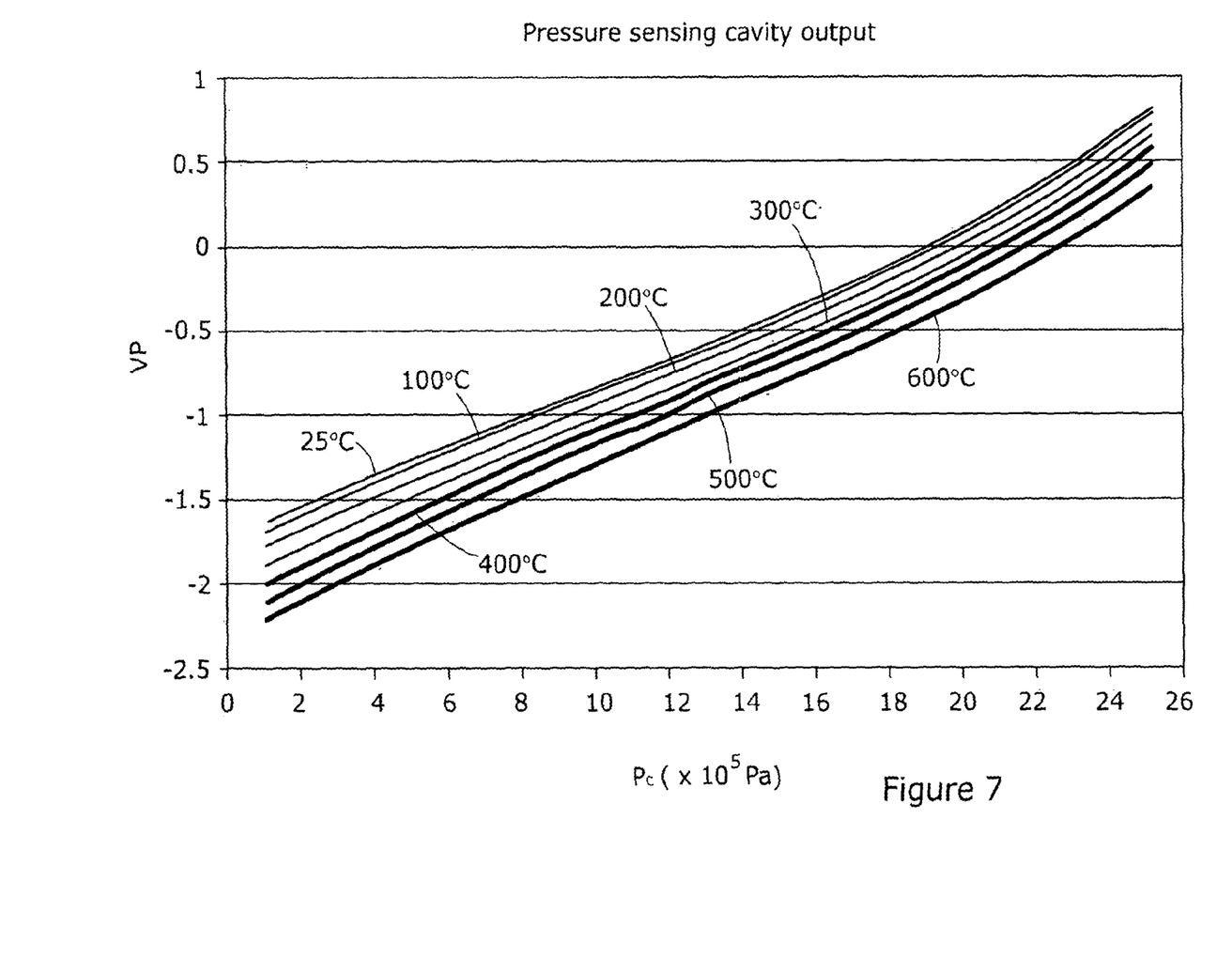
FIG. 7 is a graph showing calibration curves of a signal VP derived from response of a pressure sensing optical cavity to changes in calibration pressure $P_c$, at a number of different calibration temperatures $T_c$.

FIG. 7 illustrates a graph of the pressure sensing cavity output 69, represented as a voltage VP under a range of applied temperatures $T_c$ and pressures $P_c$. During the calibration of the pressure sensor, a function such as a polynomial equation is fitted to this data to give a function relating calibration pressure $P_c$ to calibration temperature $T_c$, and VP as follows:

$$P_c = A(T_c)*VP^N + B(T_c)*VP^{N-1} + \ldots + Y(T_c)*VP + Z(T_c) \qquad (2)$$

where: $A(T_c), B(T_c), \ldots Z(T_c)$ can be a set of functions, for example polynomials of the form:

$$A(T_c) = Aa*T_c^N + Ab*T_c^{N-1} + \ldots + Ay*T_c + Az \ldots Z(T_c)$$
$$= Za*T_c^N + Zb*T_c^{N-1} + \ldots + Zy*T_c + Zz$$

and, Aa, Ab ... Zy and Zz are polynomial coefficients.

However, for this to be useful in operating the pressure sensor a value of temperature available optically from the sensor head must be used in evaluating the function, for example T1 as output by the second optical analyser and discussed above. During operation an estimate of pressure P1 is therefore obtained based on VP and T1, using the calibration coefficients, as:

$$P1 = A(T1)*VP^N + B(T1)*VP^{N-1} + \ldots + Y(T1)*VP + Z(T1) \qquad (3)$$

The temperature T1 used in the above equation is, of course, not quite correct as it shows some pressure cross-sensitivity as discussed above, leading to P1 deviating slightly from the actual pressure at the sensor head. Referring to FIG. 7 discussed below, for a 25 bar pressure range over 600° C., the error in P1 could be about 0.6% FS (150 mBar). This error source may be a significant fraction of a maximum error allowed in operation of such a sensor. It is however possible to reduce this error to a negligible amount using an iterative method, for example as follows.

The pressure cross-sensitivity of T1 is also measured during the calibration procedure. FIG. 8 provides typical example curves of the deviation dT, of T1 from a calibration temperature $T_c$ at a range of calibrated pressures $P_c$. At high pressures of around 25 bar ($2.5 \times 10^6$ Pa), a maximum error of about 15° C. (2.5% FS) is observed. From this calibration data a function expressing dT in terms of the calibration pressure $P_c$ and calibration temperature $T_c$ is derived, for example using a polynomial fit as follows:

$$dT = XA(T_c)*P_c^N + XB(T_c)*P_c^{N-1} + \ldots + XY(T_c)*P_c + XZ(T_c) \qquad (4)$$

where $XA(T_c), XB(T_c), XZ(T_c)$ can be a set of polynomials (but not only restricted to polynomials) of the form:

$$XA(T_c) = XAa*T_c^N + XAb*T_c^{N-1} + \ldots + XAy*T_c + XAz$$

...

$$XZ(T_c) = XZa*T_c^N + XZb*T_c^{N-1} + \ldots + XZy*T_c + XZz$$

and XAa, XAb ... XZy and XZz are polynomial coefficients.

During operation of the pressure sensor, the value of the temperature error dT in T1 can then be evaluated, having already calculated P1 using equation 3 above, as:

$$dT = XA(T1)*P1^N + XB(T1)*P1^{N-1} + \ldots + XY(T1)*P1 + XZ(T1) \qquad (5)$$

During operation of the pressure sensor the corrected temperature T2 is then calculated using the following equation:

$$T2 = T1 - dT \qquad (6)$$

Figure 8:
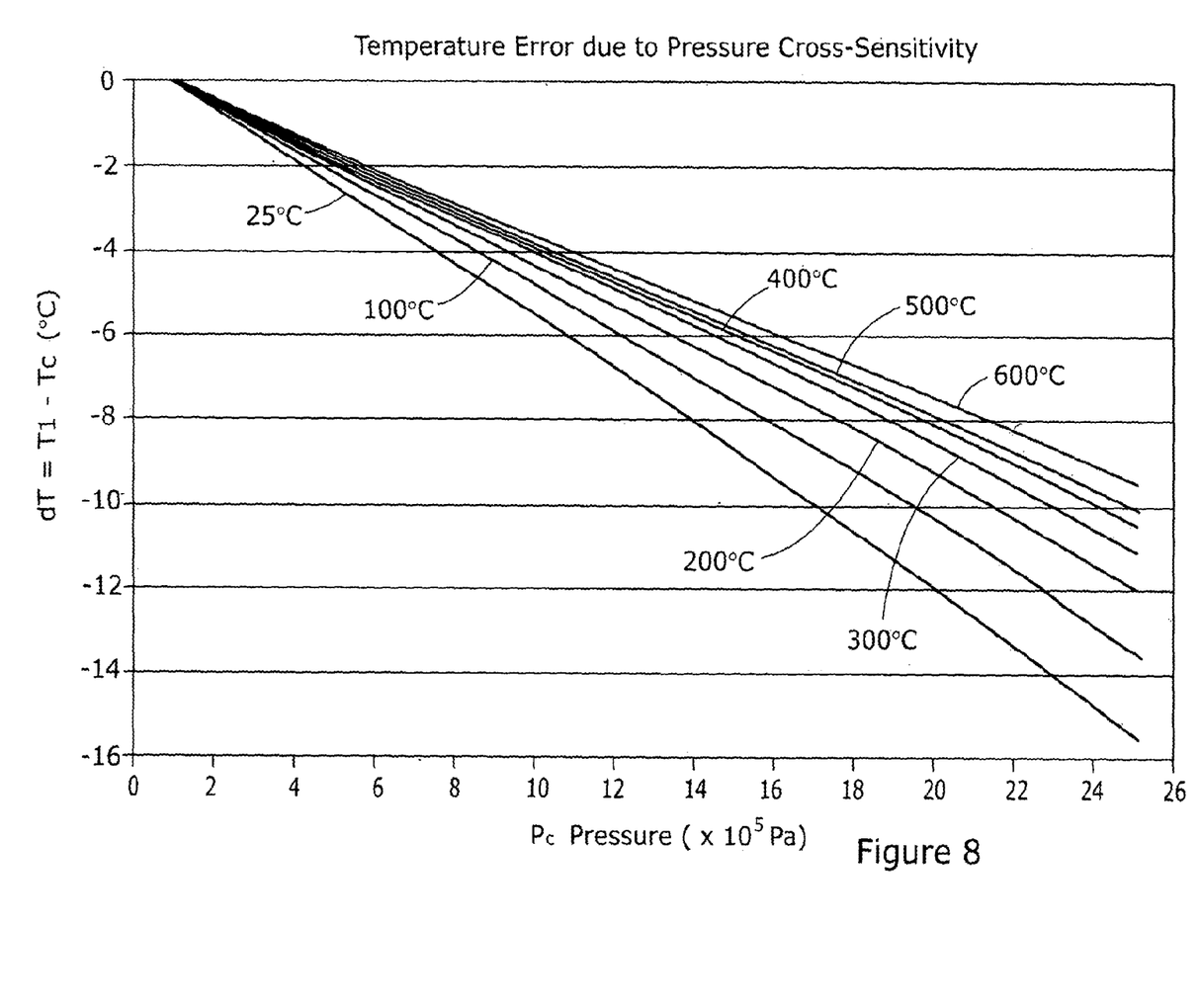
FIG. 8 is a graph showing calibration curves of a deviation dT of an estimate T1 of sensor head temperature based on optical response of a temperature sensing cavity from a calibration temperature $T_c$, over a range of calibration pressures $P_c$ and temperatures $T_c$.

Based on the data of FIGS. 7 and 8, in the case of a 25 bar sensor measured over a 600° C. temperature range, the error on the sensing element temperature can be reduced from about 2.5% FS in T1 to about 0.08% FS (0.5° C. error) in T2 and is now substantially independent of pressure.

In the same way as the estimated pressure P1 was calculated using equation 3, an improved estimated pressure P2 can now be calculated using the calibration coefficients of equation 2 again as follows:

$$P2 = A(T2)*VP^N + B(T2)*VP^{N-1} + \ldots + Y(T2)*VP + Z(T2) \qquad (7)$$

The error in the pressure has now been reduced to a negligible amount (for example <0.02% FS, i.e. 5 mbar in the system represented by FIGS. 7 and 8). In cases where better accuracy is required, it is possible to add further iterations to obtain even better temperatures and static pressures by following the above method and using P2 and T2 to calculate further refined values P3 and T3 with more accuracy, and further iterations may be carried out in the same way if desired.

The above calculations can be repeated during operation of the pressure sensor for every new value of VP. However, the frequency of output of VP by the first optical analyser 18 may be of the order of 40 KHz, whereas the temperature signal T1 may be available only at about 100 Hz. The above calculations of P2, and in the case of further iteration P3 or beyond, may be repeated at a relatively low frequency such as 100 Hz, for example using a value of VP averaged or summed to match the frequency of T1. Regardless of the details of the calculations, the value of P2, P3 or beyond may then be output as the low frequency pressure signal 82.

Figure 9:
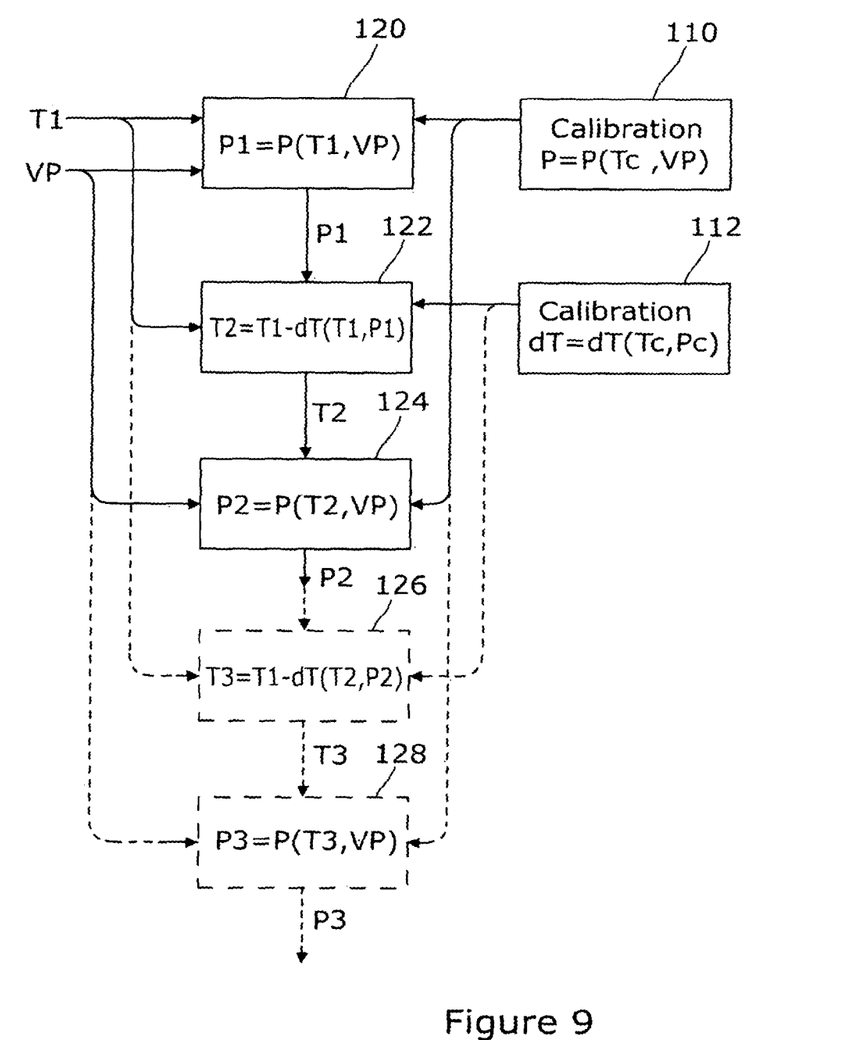
FIG. 9 illustrates a method of iteratively refining an estimate of pressure at the sensor head.

A more general form of the above calibration and iterative calculation of pressure signal is illustrated in FIG. 9. The pressure sensor is first calibrated 110 to provide a first calibration function P relating a calibration pressure $P_c$ at the sensor head to a calibration temperature at the sensor head $T_c$ and a pressure sensing cavity output VP, as $P_c = P(T_c, VP)$, where VP is determined optically using a pressure sensing cavity which has some cross sensitivity to temperature at the sensor head. The pressure sensor is also calibrated 112 to provide a second calibration function dT relating deviation in a temperature T1 of the sensor head, from a calibration temperature at the sensor head $T_c$, at $T_c$ and $P_c$, as $dT = dT(T_c, P_c)$, where T1 is determined optically using a temperature sensing optical cavity which has some cross sensitivity to pressure at the sensing head.

In a first operational step 120 of the pressure sensor, a first estimate of pressure P1 is generated using the first calibration function P evaluated using the current optically sensed temperature T1 and the current pressure sensing cavity output VP, as P1=P(T1, VP). The value of P1 is then used in a second operational step 122 to generate an updated temperature T2 using the second calibration function, the currently sensed temperature, and the first estimate of pressure P1, as T2=T1-dT(T1, P1).

In a third operational step 124, then, a second and improved estimate of pressure P2 is generated using the first calibration function P evaluated using the updated temperature T2 and the current pressure sensing cavity output VP, as P1=P(T2, VP). Further iterations of updating the temperature and improving the estimate of pressure can be carried out as illustrated by optional operational steps 126 and 128.

How the high frequency pressure signal 92 may be derived by the second processor 90 taking into account the temperature of the sensor head 14 derived from the one or more temperature sensing cavities, based on suitable calibration procedures, is now discussed.

A high frequency component of the pressure at the sensor head can be calculated by the second processor 90 by applying a high pass filter to the pressure sensing cavity output VP to yield $VP_h$, and multiplying this by a calibration factor 84 calculated from current values of VP and T2 by the first processor 80. Such a calibration factor dP/dVP can be derived by differentiating pressure equation 7 for P2 (or a further iteration of equation 5 for P3 etc) to give:

$$dP/dVP = NrA(T2)*VP^{N-1} + (N-1)*B(T2)*VP^{N-2} + \ldots + Y(T2) \quad (8)$$

This high frequency component of pressure, for example $VP_h \times dP/dVP$, can then also be corrected so that the high frequency pressure signal 92 exhibits a constant proportionality changes in pressure at the sensor head 14 across the whole pressure and temperature range.

Figure 10:
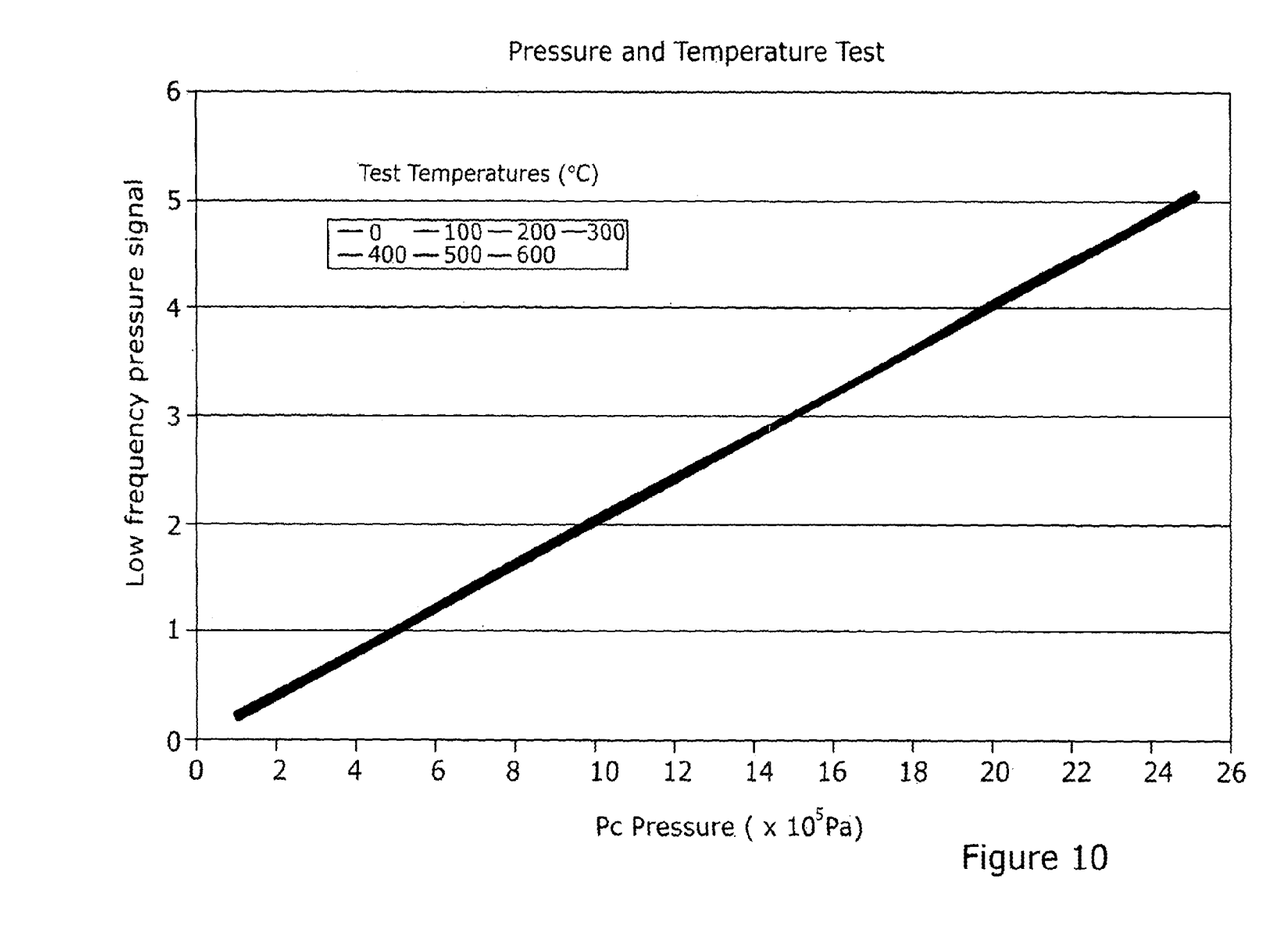
FIG. 10 shows an output pressure signal of the calibrated pressure sensor against a range of calibration pressures $P_c$ at a range of test temperatures.

A sensor as illustrated in the figures and discussed above was tested with the above calibration and operational algorithms and the resulting low frequency pressure signal 82 plotted against test calibration pressure $P_c$ and temperature $T_c$ is illustrated in FIG. 10. The lines representing low frequency pressure signal 82 are now linear over the pressure range and also superimposed for all temperatures. Dynamic error over pressure and temperature is less than 5% (typically 3%) compared to 15% (10% non-linearity+5% error over temperature) for a prior art system designed to be reasonably linear but without temperature correction. The improvement may be much stronger over a prior art system not designed to exhibit a linear response.

The described arrangements enable a linear response to be provided as shown in FIG. 10, when the underlying response of the sensor is not linear for example as shown by the curved responses of FIG. 7. This enables use of a sensor head which, for example provides an underlying linear response up to a pressure of 10 bar ($1 \times 10^6$ Pa) to be used, for example, to a pressure of 25 bar, thereby improving dynamic resolution, by a factor of ×2.5 in this case.

Various modifications may be made to the described embodiments. For example, although a sensor head using pressure and temperature sensing Fabry-Perot optical cavities has been described, the invention may also be applied where a sensor head comprises other types of pressure and/or temperature sensing interference elements, such as Michelson and/or Mach-Zehnder interference elements. The invention may also be used to provide temperature correction, in respect of a sensor head, of signals representing measurands other than pressure, such as acceleration, and may more generally be used to provide correction of one measurand by another, wherein the measurands are determined using different sensing interference elements at the sensor head.

The invention claimed is:

1. An optical pressure sensor comprising:
   a sensor head comprising a pressure sensing optical cavity and at least one temperature sensing optical cavity; and
   an interrogator optically coupled to the sensor head, and arranged to generate at least one signal representing pressure at the sensor head responsive to the pressure sensing optical cavity, the at least one signal representing pressure being temperature corrected by the interrogator responsive to the at least one temperature sensing optical cavity,
   wherein the interrogator comprises a first optical analyser arranged to detect a response of the pressure sensing optical cavity to pressure at the sensor head, and a second optical analyser arranged to detect a response of the at least one temperature sensing optical cavity to temperature at the sensor head,
   wherein the second optical analyser comprises a spectral engine arranged to detect an interference spectrum in probe light reflected from the at least one temperature sensing optical cavity, and to detect the response of the at least one temperature sensing optical cavity to temperature from the interference spectrum, and
   wherein the pressure sensing optical cavity is arranged such that the second optical analyser does not resolve the pressure sensing optical cavity from the at least one temperature sensing optical cavity.

2. The optical pressure sensor of claim 1 wherein the first optical analyser is arranged to separately detect the intensities at two different wavelengths of probe light reflected at the pressure sensing optical cavity, and to generate the signal representing pressure at the sensor head responsive to a relationship between the detected intensities at the two different wavelengths.

3. The optical pressure sensor of claim 1 wherein the second optical analyser is arranged to detect a peak corresponding to the at least one temperature sensing optical cavity in a discrete Fourier transform of the interference spectrum, and to detect response of the at least one temperature sensing optical cavity to temperature using the peak.

4. The optical pressure sensor of claim 1 wherein the response of the second optical analyser to the at least one temperature sensing optical cavity also includes a response to pressure at the sensor head.

5. The optical pressure sensor of claim 1 wherein the interrogator is arranged to provide a temperature correction to the signal representing pressure, with a further correction for a partial response of the second optical analyser to the pressure sensing optical cavity.

6. The optical pressure sensor of claim 1 wherein the interrogator is arranged to provide the temperature correction to the signal representing pressure by:
   calculating a first estimate of pressure using response of the pressure sensing optical cavity to pressure at the sensor head and first estimate of temperature based on response of the at least one temperature sensing optical cavity to temperature at the sensor head;
   calculating a second estimate of temperature based on the first estimate of pressure and the first estimate of sensor temperature; and
   calculating a second estimate of pressure using the response of the pressure sensing optical cavity to pressure at the sensor head and the second estimate of temperature.

7. The optical pressure sensor of claim 6 arranged to carry out one or more further iterations of calculating a further revised estimate of temperature based on a revised estimate of pressure and a revised estimate of temperature, and a further revised estimate of pressure using the response of the pressure sensing optical cavity to pressure at the sensor head and the further revised estimate of temperature.

8. The optical pressure sensor of claim 6 wherein the step of calculating each estimate of pressure is performed using a calibration of response of the pressure sensing optical cavity to pressure at the sensor head against calibration temperatures and calibration pressures at the sensor head.

9. The optical pressure sensor of claim 6 wherein the step of calculating each revised estimate of temperature is performed using a calibration of response of the at least one temperature sensing optical cavity head against calibration temperatures and calibration pressures at the sensor head.

10. The optical pressure sensor of claim 1 wherein the optical cavities are integrally formed in the sensor head, the pressure sensing optical cavity comprising a physical cavity in the sensor head.

11. The optical pressure sensor of claim 10 wherein the at least one temperature sensing optical cavity comprises material of the sensor head defining an optical cavity bounded by spaced reflective surfaces.

12. The optical pressure sensor of claim 11 wherein one of the spaced reflective surfaces defines a surface of the physical cavity in the sensor head which is comprised in the pressure sensing optical cavity.

13. The optical pressure sensor of claim 1 wherein the sensor head is formed of sapphire.

14. The optical pressure sensor of claim 1 wherein the pressure sensing optical cavity and the at least one temperature sensing optical cavity are adjacent to each other.

15. The optical pressure sensor of claim 1 wherein the pressure sensing optical cavity and the at least one temperature sensing optical cavity are parallel to each other.

16. The optical pressure sensor of claim 1 wherein the pressure sensing optical cavity and the at least one temperature sensing optical cavity are Fabry-Perot cavities.

17. The optical pressure sensor of claim 1 wherein the sensor head is optically coupled to the interrogator by at least one optical fiber.

18. The optical pressure sensor of claim 1 wherein the optical pressure sensor is arranged to interrogate both the pressure sensing optical cavity and the temperature sensing optical cavity using a same optical fiber coupling the interrogator to the sensor head.

19. The optical pressure sensor of claim 1 wherein the first and second optical analysers use respective probe light detection elements, for detecting the responses of the pressure and temperature sensing optical cavities respectively.

20. A method of operating an optical pressure sensor comprising a sensor head having a pressure sensing optical cavity and at least one temperature sensing optical cavity, comprising:
    optically detecting the pressure sensing cavity and the at least one temperature sensing cavity; and
    generating at least one signal representing pressure at the sensor head responsive to the detection of the pressure sensing optical cavity, the step of generating comprising temperature correcting the at least one signal representing pressure responsive to detection of the at least one temperature sensing optical cavity,
    wherein the at least one of the temperature sensing optical cavity is detected using a spectral method which does not resolve the pressure sensing optical cavity from the at least one temperature sensing optical cavity.

21. The method of claim 20 wherein the step of generating at least one signal representing pressure comprises providing the temperature correction to the signal representing pressure with a further correction for influence of pressure at the sensor head on the detection of the at least one temperature sensing optical cavity.

22. The method of claim 20 wherein generating the signal representing pressure at the sensor head comprises:
    calculating a first estimate of pressure using response of the pressure sensing optical cavity to pressure at the sensor head and first estimate of temperature based on response of the at least one temperature sensing optical cavity to temperature at the sensor head;
    calculating a second estimate of temperature based on the first estimate of pressure and the first estimate of sensor temperature; and
    calculating a second estimate of pressure using the response of the pressure sensing optical cavity to pressure at the sensor head and the second estimate of temperature.

23. The method of claim 22 further comprising one or more further iterations of calculating a further revised estimate of temperature based on a revised estimate of pressure and a revised estimate of temperature, and a further revised estimate of pressure using the response of the pressure sensing optical cavity to pressure at the sensor head and the further revised estimate of temperature.

24. The method of claim 22 wherein the step of calculating each estimate of pressure is performed using a calibration of response of the pressure sensing optical cavity to pressure at the sensor head against calibration temperatures and calibration pressures at the sensor head, and the step of calculating each revised estimate of temperature is performed using a calibration of response of the at least one temperature sensing optical cavity head against calibration temperatures and pressures at the sensor head.

25. The method of claim 20 wherein the pressure sensing optical cavity and the at least one temperature sensing optical cavity are Fabry Perot cavities at the sensor head.

26. The method of claim 25 wherein the pressure sensing optical cavity and the at least one temperature sensing optical cavity are parallel and adjacent to each other in the sensor head.

27. The method of claim 20 wherein:
    the at least one signal representing pressure is generated by a first optical analyser;
    the detection of the at least one temperature sensing optical cavity is by a second optical analyser using a spectral engine to detect an interference spectrum in probe light reflected from the at least one temperature sensing optical cavity, and detecting response of the at least one temperature sensing optical cavity to temperature from the interference spectrum; and
    the pressure sensing optical cavity is arranged such that the second optical analyser does not resolve the pressure sensing optical cavity from the at least one temperature sensing optical cavity.

* * * * *